June 29, 1937. N. HEISDORF 2,085,657
DRIVING MECHANISM
Filed April 23, 1934
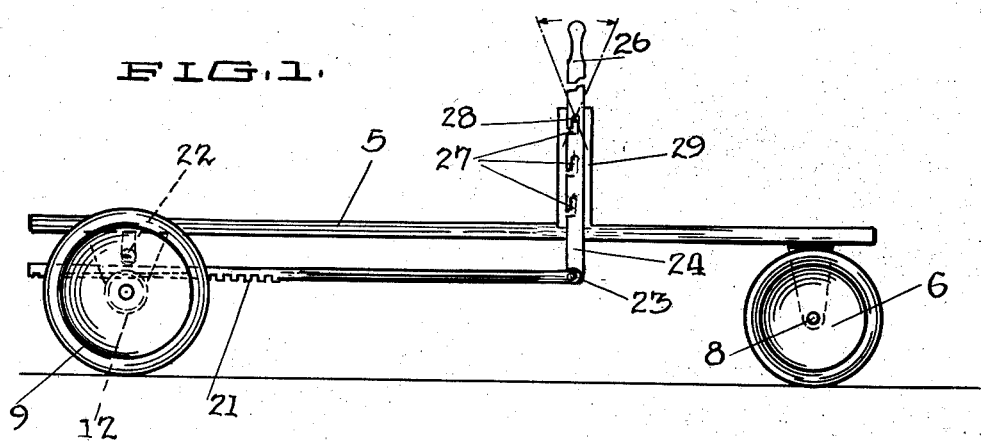
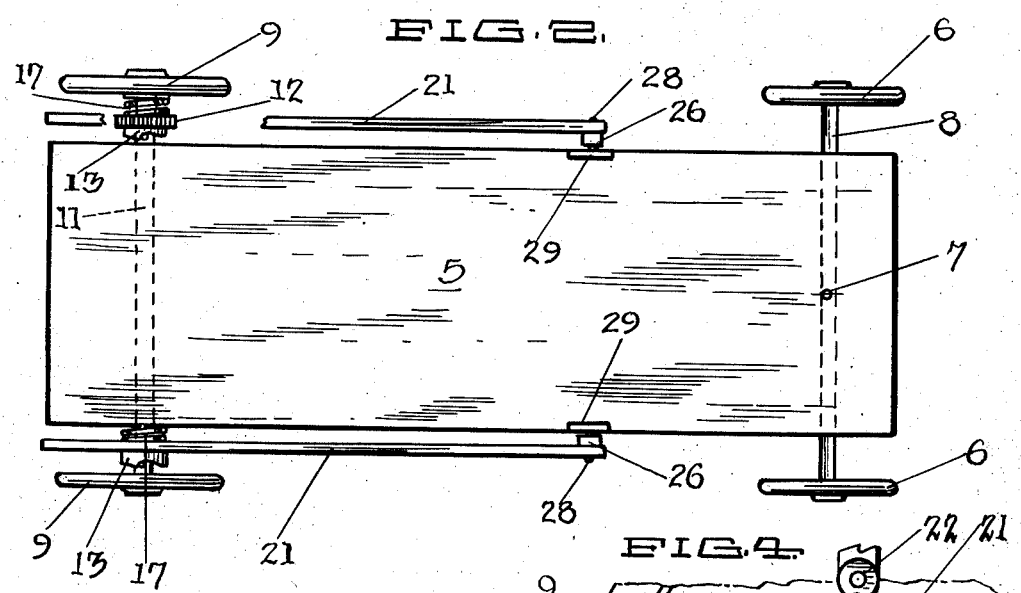
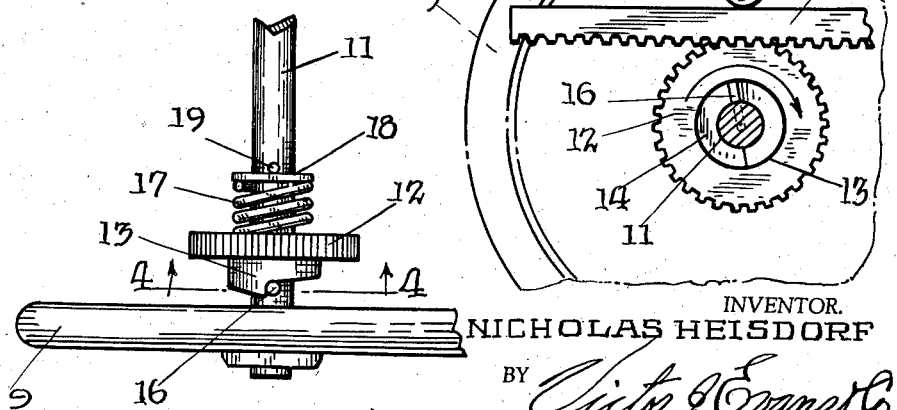
INVENTOR.
NICHOLAS HEISDORF
BY
ATTORNEYS Patented June 29, 1937

2,085,657

UNITED STATES PATENT OFFICE 2,085,657

DRIVING MECHANISM

Nicholas Heisdorf, San Francisco, Calif.

Application April 23, 1934, Serial No. 722,028

2 Claims. (Cl. 208—37)

This invention relates to improvements in vehicles and has particular reference to power transmitting mechanism for children's vehicles, invalid chairs and the like.

The principal object of the invention is to provide means whereby the vehicle may be driven at varying speeds through the changing of the fulcrum of the power lever.

A further object is to produce a device which is extremely simple and, therefore, economical to manufacture.

A still further object is to produce a device which may be quickly applied to any vehicle of this character.

Other objects and advantages will be apparent during the course of the following description.

In the accompanying drawing forming a part of this specification and in which like numerals are employed to designate like parts throughout the same, Fig. 1 is a side elevation of a child's vehicle having my invention applied thereto, Fig. 2 is a top plan view of Fig. 1, Fig. 3 is an enlarged fragmentary detail view of one of the wheels and the driving connection, and Fig. 4 is a fragmentary view taken on the line 4—4 of Fig. 3.

In vehicles of this character it has been common to employ a fixed pivoted lever through the medium of which power was transmitted to the wheels thereof. The leverage was so arranged that the vehicle could be moved along the level surface, but when an upgrade was encountered the operator of the vehicle either needed assistance by being pushed or pulled or had to get off the vehicle to walk, which has been overcome in applicant's invention by providing varying fulcrum points of the actuating lever so that the leverage applied may be adjusted to accommodate for the increased power which is delivered to the rear or driving wheels of the vehicle.

In the accompanying drawing wherein for the purpose of illustration is shown a preferred embodiment of my invention, the numeral 5 designates the body or supporting surface of any vehicle to which is pivoted front wheels 6 through the medium of the customary king bolt 7 and axle 8. The rear wheels 9 are secured to an axle 11 in such a manner that they rotate with the axle which axle also rotates in bearings carried beneath the body 5. In order to rotate this axle and therefore the wheels 9, I mount upon each end of the axle a freely rotatable gear 12. This gear has a collar 13 provided with a ratchet face 14. This ratchet face is capable of engaging a pin 16 positioned in the axle 11. A spring 17 urges the gear and ratchet surface against the pin 16 at all times. This spring abuts a washer 18 held in position by a pin 19.

Referring now to Fig. 4 it will be noted that a rack 21 engages the gear 12 and is held in contact therewith by a roller 22. The end of this rack is pivoted as at 23 to a lever 24 having a handle 26. This lever 24 has bayonet slots 27 any one of which may be brought into engagement with a fulcrum pin 28 carried in an upright 29 mounted upon the vehicle.

The result of this construction is that when a vehicle is operated with the lever in the position shown in Fig. 1, a short movement of the handle 26 will cause a long movement of the pivot point 23 and consequently a rapid and high speed movement may be accomplished without exerting a great amount of power. When the lever 24 is moved so that the fulcrum pin 28 is engaged by the lowermost of the bayonet slots, it will be apparent that this movement of the lever is such that the handle 26 will move through a relatively long arc, while the pivot point 23 will move through a relatively short arc and that with this arrangement a much greater leverage is possible, but due to the difference in length of stroke a slower ratio of gear movement will take place, that is, assuming that the handle is moved at the same uniform speed at all times. When the fulcrum pin is in the middle bayonet slot, a different power ratio will exist. It will, therefore, be seen that by the movement of the lever from one position to another, I may accomplish various speed or power ratios to my vehicle.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In combination with a vehicle of the class described, of a vehicle body having fixed uprights mounted on opposite sides thereof, and provided with pivoted actuating levers, a rear axle having pinions mounted thereon, rack bars connected to said levers and adapted to engage said pinions, means for adusting the throw of said levers and said rack bars, comprising angularly disposed slots formed in said levers and clutch means arranged on said rear axle whereby the manual operation of said actuating levers is effective in one direction only.

2. In a manually propelled vehicle of the class described, a body mounted upon front and rear wheels and having fixed uprights, actuating vertically adjustable levers mounted on said uprights, a rear axle having pinions mounted thereon, rack bars connected to said actuating levers and normally engaging said pinions, and spring urged clutches arranged on said rear axle to cause power from said levers to be transmitted to the rear shaft, and roller means for holding said rack constantly in mesh with said pinion.

NICHOLAS HEISDORF.